United States Patent
Lucas et al.

(10) Patent No.: US 10,085,605 B2
(45) Date of Patent: Oct. 2, 2018

(54) VACUUM ATTACHMENT

(71) Applicant: The Boeing Company, Chicago, IL (US)

(72) Inventors: Ryan C. Lucas, Puyallup, WA (US); Daniel J. Perron, Federal Way, WA (US); Alan G. Burg, Des Moines, WA (US); Jeffrey H. Olberg, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 611 days.

(21) Appl. No.: 14/686,819

(22) Filed: Apr. 15, 2015

(65) Prior Publication Data

US 2016/0302633 A1  Oct. 20, 2016

(51) Int. Cl.
*A47L 9/02* (2006.01)
*B08B 5/04* (2006.01)
*B32B 3/12* (2006.01)

(52) U.S. Cl.
CPC ............ *A47L 9/02* (2013.01); *B08B 5/04* (2013.01); *B32B 3/12* (2013.01); *B32B 2250/40* (2013.01); *B32B 2307/102* (2013.01); *B32B 2307/732* (2013.01); *B32B 2607/00* (2013.01); *Y10S 901/40* (2013.01)

(58) Field of Classification Search
CPC .............. A47L 9/02; B32B 3/12; B08B 5/04
USPC ....................... 15/421; 428/73, 116
See application file for complete search history.

(56) References Cited

U.S. PATENT DOCUMENTS

| | | | | |
|---|---|---|---|---|
| 1,067,802 A * | 7/1913 | Dana | ...... | A01D 46/10 15/387 |
| 1,987,296 A * | 1/1935 | Hoover | ...... | A47L 9/02 15/401 |
| 2,027,544 A * | 1/1936 | Lofgren | ...... | A47L 9/02 15/420 |
| 2,068,496 A * | 1/1937 | Linghammar | ...... | A47L 9/02 15/415.1 |
| 2,096,595 A * | 10/1937 | Sanford | ...... | E02F 3/902 15/421 |
| 2,348,082 A * | 5/1944 | Lofgren | ...... | A47L 9/02 15/393 |
| 3,238,557 A * | 3/1966 | Foster | ...... | A47L 9/02 15/339 |
| 3,616,119 A * | 10/1971 | Wukowitz | ...... | B31D 3/005 428/116 |
| 4,175,872 A * | 11/1979 | Primus | ...... | B01F 5/0206 366/139 |
| 5,192,267 A * | 3/1993 | Shapira | ...... | A61B 18/1402 604/22 |
| 2007/0266521 A1 | 11/2007 | Pang Kim Pong et al. | | |

\* cited by examiner

*Primary Examiner* — Bryan R Muller
(74) *Attorney, Agent, or Firm* — Miller, Matthias & Hull LLP

(57) ABSTRACT

A vacuum attachment comprises a base having an upper face and a lower face, and an outer surface and an inner surface. The inner surface defines a first flow passage between the upper face and the lower face. The lower face provides a smooth contact surface. A single orifice extends through the base from the outer surface to the inner surface. The orifice is spaced apart from the lower face.

20 Claims, 5 Drawing Sheets

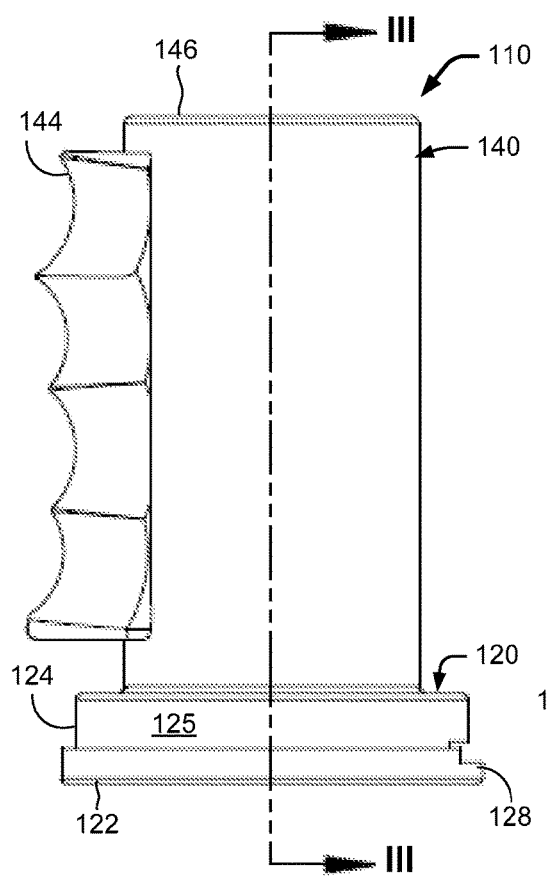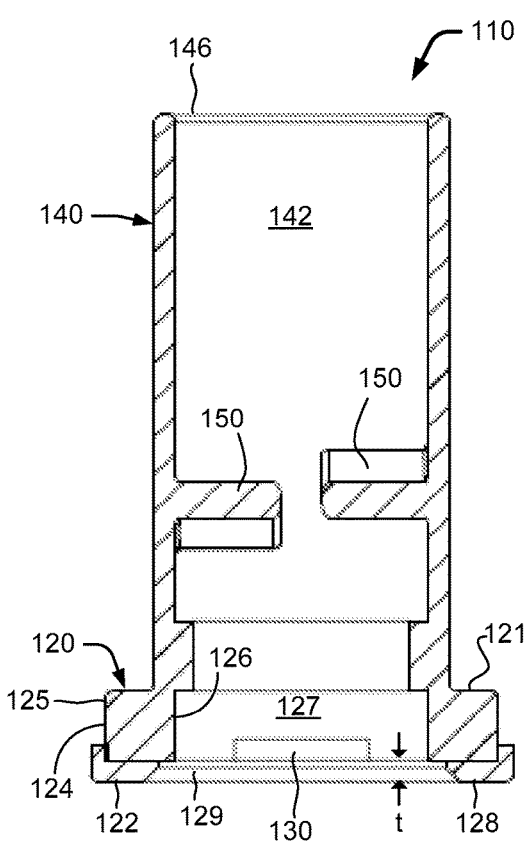

VACUUM ATTACHMENT

BACKGROUND

A honeycomb sandwich panel may be manufactured by bonding a honeycomb core sheet between two face sheets. Prior to bonding, dust may be removed from the honeycomb core sheet to produce a better bonding surface.

Dust removal is difficult for a honeycomb core sheet having small, fragile core cells. The use of pressurized air or suction does not adequately remove the dust. Moreover, pressurized air or suction can create point loads on the top of the core cells, which can damage the bonding surface.

SUMMARY

According to an embodiment herein, a vacuum attachment comprises a base having an upper face and a lower face, and an outer surface and an inner surface. The inner surface defines a first flow passage between the upper face and the lower face. The lower face provides a smooth contact surface. A single orifice extends through the base from the outer surface to the inner surface. The orifice is spaced apart from the lower face.

According to another embodiment herein, a method of removing particles from open cells of a core sheet comprises moving a base of a vacuum attachment along a face of the core sheet. The base has an outer surface and an inner surface, the inner surface defining a flow passage. The base further has an orifice extending from the outer surface to the inner surface and opening into the flow passage. While the base is being moved, suction is applied to the flow passage to draw air through the orifice and into the flow passage. The air flowing into the flow passage also flows into the cells and creates a swirl that removes the particles from the cells.

According to another embodiment herein, a system comprises a vacuum attachment including a base having a lower contact surface, an outer surface and an inner surface. The inner surface defines a flow passage. A single orifice extends from the outer surface to the inner surface and opens into the flow passage. The orifice is spaced apart from the contact surface. The system further comprises a vacuum source for applying suction to the flow passage.

These features and functions may be achieved independently in various embodiments or may be combined in other embodiments. Further details of the embodiments can be seen with reference to the following description and drawings.

BRIEF DESCRIPTION OF THE DRAWINGS

FIGS. 1 and 2 are illustrations of a vacuum attachment.

FIG. 3 is a cross-sectional view of the vacuum attachment, taken along lines III-III in FIG. 2.

DETAILED DESCRIPTION

Figure 1:
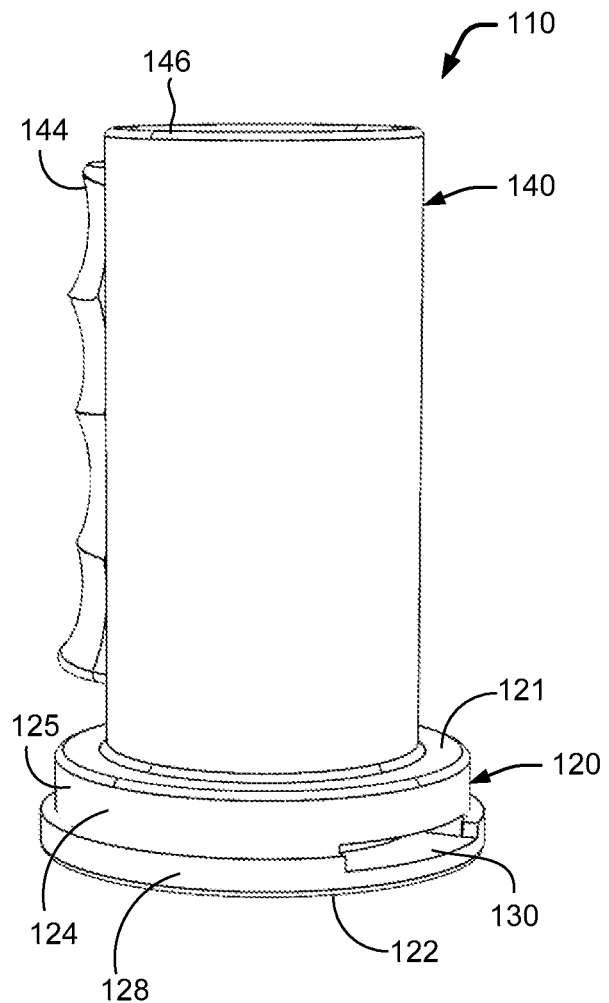
Figure 4:
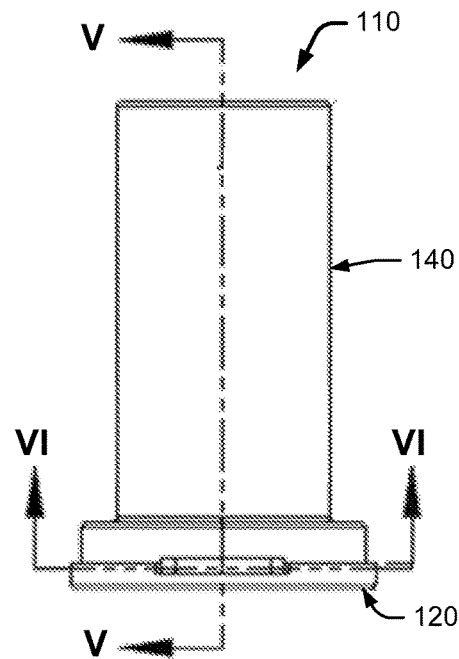
FIG. 4 is another illustration of the vacuum attachment.
Figure 5:
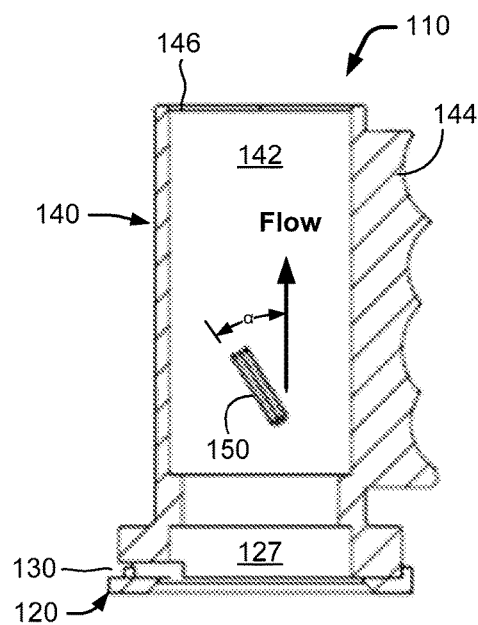
FIG. 5 is a cross-sectional view of the vacuum attachment, taken along lines V-V in FIG. 4.

Reference is made to FIGS. 1-6, which illustrate a vacuum attachment 110. The vacuum attachment 110 includes a base 120 having an upper face 121, a lower face 122, an outer surface 125, and an inner surface 126. The inner surface 126 defines a first flow passage 127, which extends from the upper face 121 to the lower face 122. The lower face 122 provides a smooth contact surface.

In some configurations, the base 120 may consist of a conduit whose ends provide the upper and lower faces 121 and 122. In the configuration of FIGS. 1-6, however, the base 120 includes a conduit 124 and a metal cap 128 on a first end of the conduit 124. A second end of the conduit 124 provides the upper face 121, and a lower surface of the metal cap 128 provides the lower face 122 (that is, the smooth contact surface). The lower face 122 provided by the metal cap 128 may have a machined surface finish.

An opening 129 in the metal cap 128 is aligned with the first flow passage 127. The opening 129 is flared outward to increase the coverage of surface area.

A single orifice 130 extends through the base 120 from the outer surface 125 to the inner surface 126, and opens up into the first flow passage 127. The orifice 130 is spaced apart from the upper and lower faces 121 and 122. The thickness (t) of the metal cap 128 may determine the spacing of the orifice 130 with respect to the lower face 122. The orifice 130 is directed towards the middle of the first flow passage 127.

Figure 6:
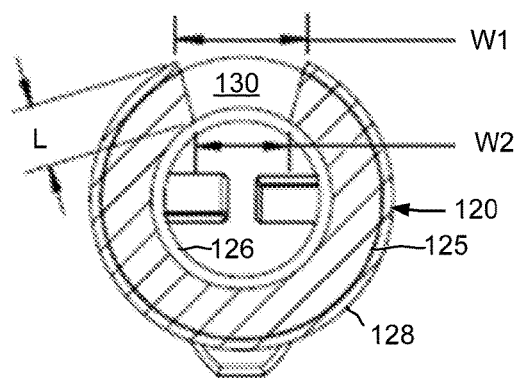
FIG. 6 is a cross-sectional view of the vacuum attachment, taken along lines VI-VI in FIG. 4.

As best shown in FIG. 6, the orifice 130 has a relatively rectangular transverse cross section. The orifice 130 is chamfered such that its width W1 at the outer surface 125 is larger than its width W2 at the inner surface 126. Configured as such, the orifice 130 increases turbulence of the air flowing into the first flow passage 127.

A conduit 140 extends upward from the upper face 121 of the base 120. The conduit 140 defines a second flow passage 142 that is in fluid communication with the first flow passage 127. In the configuration of FIGS. 1-6, the conduits 124 and 140 are integrally formed.

The conduit 140 is long enough to be grasped by a human hand. A hand grip 144 may be formed on an outer surface of the conduit 140. A free end 146 of the conduit 140 may be configured to be connected to a vacuum source.

Figure 7:
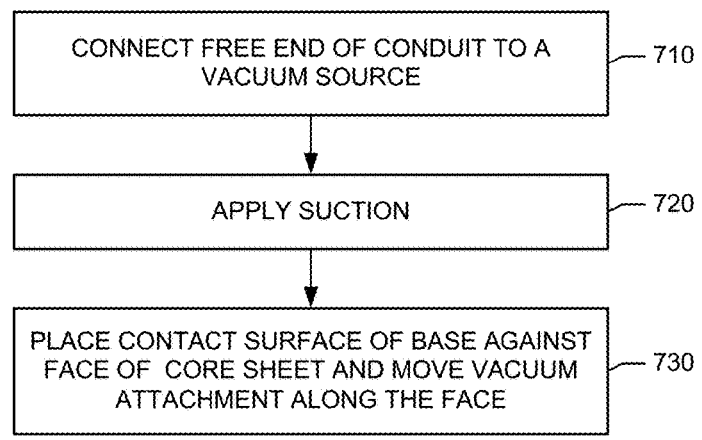
FIG. 7 is an illustration of a method of using the vacuum attachment to remove dust from a core having a plurality of open cells.
Figure 8:
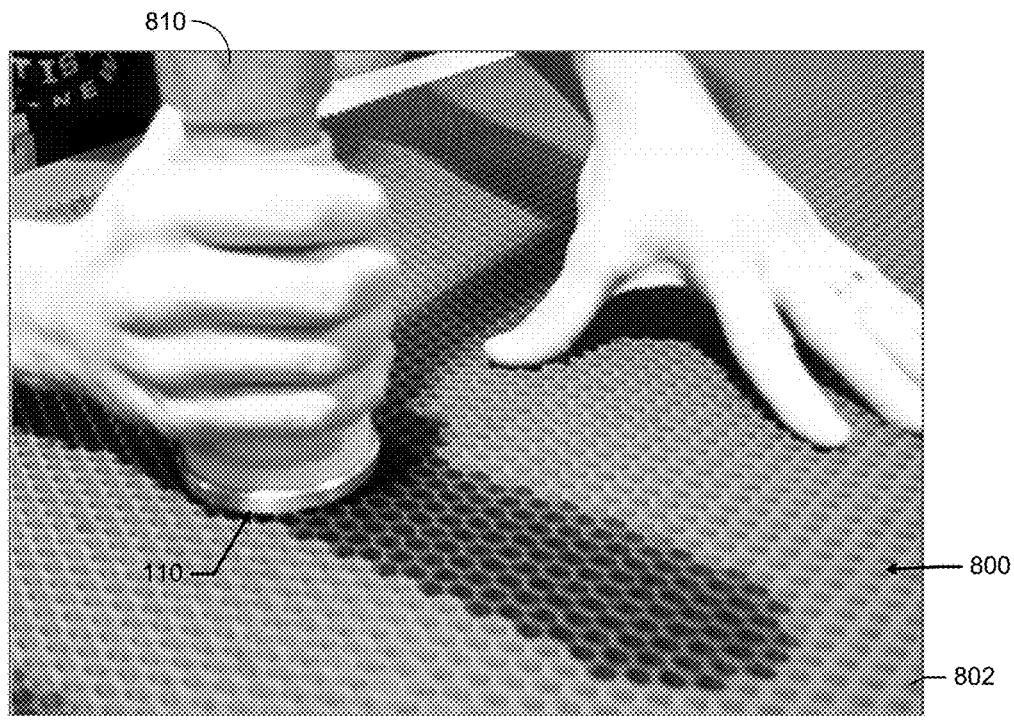
FIG. 8 is a picture of a honeycomb core sheet and a vacuum attachment removing dust from the core sheet.

Reference is now made to FIGS. 7 and 8, which illustrate a method of using the vacuum attachment 110 to remove particles from open cells 802 of a core sheet 800. The core sheet 800 of FIG. 8 has a honeycomb configuration. Dust and other particles can accumulate within the cells 802 and adhere to walls of the cells 802.

At block 710, the free end 146 of the conduit 140 is connected to a vacuum source (not shown) via a vacuum hose 810. The vacuum source should pull roughly 150 cubic feet per minute (CFM) or better. The vacuum source may include a commercial wet/dry vacuum.

At block 720, the vacuum source is turned on to apply suction to the free end 146 of the conduit 140. Air is sucked into the orifice 130, flows into the first passage 127, up through the second flow passage 142, and out of the conduit 140.

At block 730, the contact surface of the base 120 is placed against a face of the core sheet 800 (the vacuum source may instead be turned on after the base 120 has been placed against the core sheet 800). A synergy between the cells 802 of the core sheet 800 and the base 120 results. The air flowing at a high rate through the orifice 130 and into the first flow passage 127 also flows into and interacts with the open cells 802 to create a swirl that effectively forces particles off the walls of the cells 802. These freed particles are drawn from the first flow passage 127, through the second flow passage 142, and out of the conduit 140.

The core sheet 800 is cleaned by moving the vacuum attachment along the face of the core sheet 800. The machined contact surface is very smooth and glides along the face of the core sheet 800. The machined contact surface may have a roughness of 63 Ra or lower. Since the orifice 130 is spaced apart from the core sheet 800, it does not get caught on the walls of the cells 802.

The swirl removes dust and other particles without creating point loads on top of the cells 802. In addition, the cap 128 provides sufficient surface area to glide over the core sheet 800 and does not create a point load or catch or damage the top of the cells 802.

The orifice 130 also ensures that air does not dead head on top of core sheet 800, which would stop the dust removal action. A dead head condition occurs when the incoming air coming is completely blocked off and there is little to no air movement.

Returning to FIGS. 1-6, the conduit 140 may include first and second fins 150 extending into the second flow passage 142. The fins 150 are configured to enhance the swirl. Fin angles α between 50 and 70 degrees with respect to normal air flow have been found to result in better particle removal.

The vacuum attachment 110 is not limited to two fins 150. Another configuration of the vacuum attachment1 110 may include fewer than two (zero or one) fins 150 or more than two fins 150.

In FIGS. 1-6, the base 120 is shown as having a greater outer diameter than the conduit 140. However, in other configurations of the vacuum attachment 110, the base 120 and the conduit 140 may have the same outer diameters, or the base 120 may have a larger outer diameter.

In FIGS. 1-6, the base 120 and the conduit 140 and their flow passages 127 and 142 have a circular transverse cross-section. However, the flow passages 127 and 142 are not so limited. The transverse cross-section may be oval or some other geometry that does not have sharp corners.

FIG. 8 shows a vacuum attachment 110 that was constructed and demonstrated on a honeycomb core sheet 800. The honeycomb core sheet 800 of FIG. 8 is two inches thick and has a 0.375" cell size. The honeycomb core sheet 800 is configured for an acoustic panel. In general, acoustic core panels have a tight weave fabric septum across every cell and any dust left in the cells has the potential to clog that septum.

The vacuum attachment 110 shown in FIG. 8 has an overall length of about 4.75 inches, and the flow passages 127 and 142 have an inner diameter of about 2 inches. The orifice 130 has length L (see FIG. 6) of about 0.6 inches and a height of about 0.15 inches. The orifice 130 has a width W1=1.3 inches at the outer surface 125, and a width W2=0.95 inches at inner surface 126. The fins 150 are about 0.125 inches thick and extend 0.7 inches from the inner wall of the conduit 140.

The cap 128 is made of a contact-approved metal such as aluminum. Unlike a plastic, the contact-approved metal does not leave behind plasticizers or other contaminants that can inhibit bonding of the core sheet 800 to another piece (e.g., a face sheet).

FIG. 8 also illustrates the effectiveness of the vacuum attachment 110 in removing dust from the honeycomb core sheet 800. A cleaned swath of the core sheet 800 is clearly visible.

The contribution of the orifice 130 and the open cells 802 to swirl creation was tested by moving the vacuum attachment 110 over a flat surface. The orifice 130 had no noticeable impact on dust removal from the flat surface. Air rushing through the orifice 130 merely pushed particles against an opposite surface of the base 120.

The vacuum attachment 110 may effectively remove dust from a core sheet 800 having a cell geometry other than a honeycomb geometry. Other cell geometries include round, square or rectangular.

FIG. 8 illustrates a handheld operation of the vacuum attachment 110. In other configurations, however, the vacuum attachment 110 may be used as a robot end effector, which a robot may use for automated core cleaning.

Figure 9:
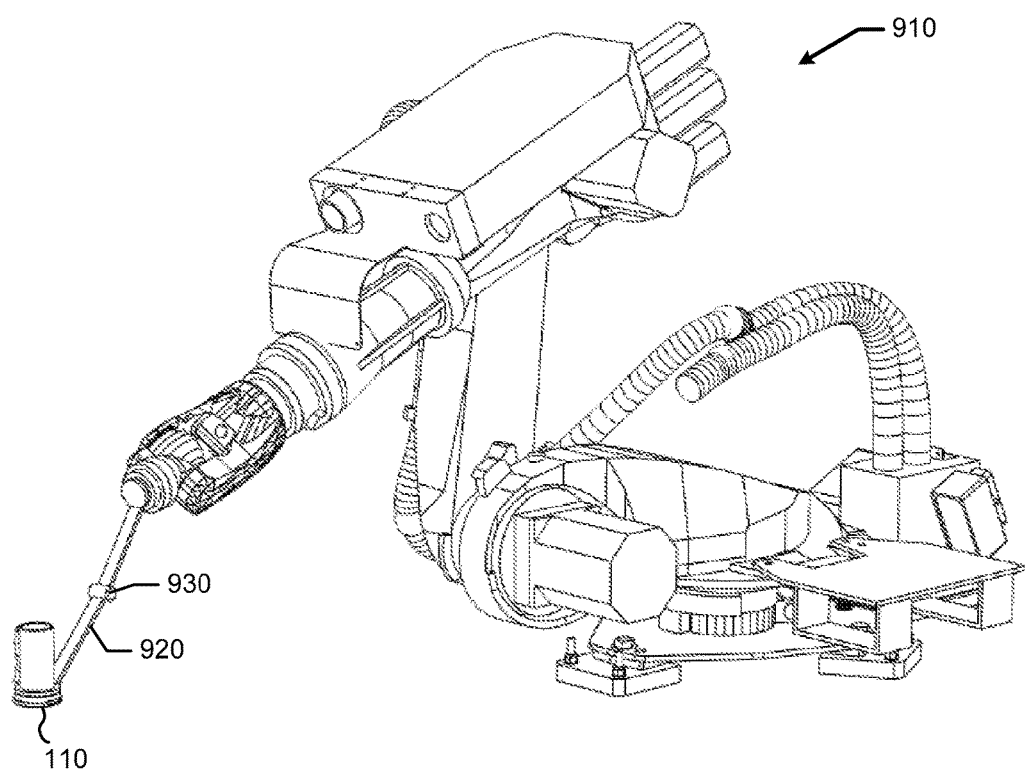
FIG. 9 is an illustration of a robot including a vacuum attachment.

Reference is made to FIG. 9, which illustrates an industrial robot 910 for performing automated core cleaning. The robot 910 includes a robot arm 920 and a vacuum attachment 110 at the end of a robot arm 920. Suction may be applied to the vacuum attachment 110 via the robot 910 or a separate vacuum source.

The vacuum attachment 110 is defined relative to the end of the robot arm 920, and the robot 910 is programmed with a tool path for the vacuum attachment 110 to follow during automated cleaning. The vacuum attachment 110 may be lightly spring-loaded to ensure constant engagement of the contact surface with the face of a core sheet. For instance, the robot arm 920 may include a spring loaded hinge 930 for lightly spring-loading the vacuum attachment 110.

The invention claimed is:

1. A vacuum attachment comprising;
   a base having an upper face, a lower face, and an outer surface disposed there between;
   a first flow passage extending between the upper face and the lower face and along an axial flow path, the first flow passage defined by an inner surface of the base;
   a metal cap covering a majority of the lower face and providing a smooth contact surface substantially parallel and spaced from the lower face;
   a cap opening defined in the metal cap such that the cap opening is fluidly coupled to and axially aligned with the axial flow path of the first flow passage; and
   a single orifice disposed on the lower face between the upper face and the contact surface, the single orifice extending through the base and a portion of the cap from the outer surface to the inner surface and opening into the first flow passage, wherein the single orifice is perpendicular relative to the cap opening of the metal cap and the axial flow path of the first flow passage.

2. The attachment of claim 1, wherein the metal cap has a machined surface that provides the smooth contact surface, the contact surface having a surface roughness of no more than 63 Ra microinches.

3. The attachment of claim 1, wherein the single orifice has a larger area at the outer surface than at the inner surface.

4. The attachment of claim 3, wherein the single orifice is chamfered.

5. The attachment of claim 1, wherein the single orifice has a relatively rectangular transverse cross section.

6. The attachment of claim 1, further comprising a conduit extending from the upper face, the conduit defining a second flow passage that is in fluid communication with the first flow passage, at least one fin located inside the conduit and extending into the second flow passage, the fin configured for swirl enhancement.

7. The attachment of claim 6, wherein the at least one fin is angled between 50 and 70 degrees with respect to normal air flow in the second flow passage.

8. An apparatus comprising the vacuum attachment of claim 1; and a vacuum source, in fluid communication with the first flow passage, for drawing air through the orifice, into the first flow passage, and out of the first flow passage.

9. A method comprising using a vacuum attachment to remove particles from a core sheet having a plurality of open cells, the method comprising:
   providing a vacuum attachment comprising;
      a base having an upper face, a lower face, and an outer surface disposed there between;
      a first flow passage extending between the upper face and the lower face and along an axial flow path, the first flow passage defined by an inner surface of the base;
      a metal cap covering a majority of the lower face and providing a smooth contact surface substantially parallel and spaced from the lower face;
      a cap opening defined in the metal cap such that the cap opening is fluidly coupled to and axially aligned with the axial flow path of the first flow passage; and
      a single orifice disposed on the lower face between the upper face and the contact surface, the single orifice extending through the base and a portion of the cap from the outer surface to the inner surface and opening into the first flow passage, wherein the single orifice is perpendicular relative to the cap opening of the metal cap and the axial flow path of the first flow passage; and
   moving the contact surface of the vacuum attachment against a face of the core sheet while applying suction to the first flow passage to draw air through the orifice and into the first flow passage, wherein the air drawn into the first flow passage interacts with the cells to remove the particles from walls of the cells.

10. A system comprising:
   a core sheet having open cells; and
   a vacuum attachment including:
      a base having an upper face, a lower face, and an outer surface disposed there between,
      a first flow passage extending between the upper face and the lower face and along an axial flow path, the first flow passage defined by an inner surface of the base,
      a metal cap covering a majority of the lower face and providing a smooth contact surface substantially parallel and spaced from the lower face, wherein the smooth contact surface of the metal cap is placed against a face of the core sheet,
      a cap opening defined in the metal cap such that the cap opening is fluidly coupled to and axially aligned with the axial flow path of the first flow passage, and
      a single orifice disposed on the lower face between the upper face and the contact surface, the single orifice extending through the base and a portion of the cap from the outer surface to the inner surface and opening into the first flow passage, wherein the single orifice is perpendicular relative to the cap opening of the metal cap and the axial flow path of the first flow passage.

11. The system of claim 10, wherein the core sheet is a honeycomb core sheet.

12. A method of removing particles from open cells of a core sheet, the method comprising:
   providing a vacuum attachment comprising;
      a base having an upper face, a lower face, and an outer surface disposed there between;
      a first flow passage extending between the upper face and the lower face and along an axial flow path, the first flow passage defined by an inner surface of the base;
      a metal cap covering a majority of the lower face and providing a smooth contact surface substantially parallel and spaced from the lower face;
      a cap opening defined in the metal cap such that the cap opening is fluidly coupled to and axially aligned with the axial flow path of the first flow passage; and
      a single orifice disposed on the lower face between the upper face and the contact surface, the single orifice extending through the base and a portion of the cap from the outer surface to the inner surface and opening into the first flow passage, wherein the single orifice is perpendicular relative to the cap opening of the metal cap and the axial flow path of the first flow passage;
   moving a base of a vacuum attachment along a face of the core sheet, the base having an outer surface and an inner surface, the inner surface defining a flow passage, the base further having an orifice extending from the outer surface to the inner surface and opening into the flow passage; and
   while the base is being moved, applying suction to the flow passage to draw air through the orifice and into the flow passage, wherein the air flowing into the flow passage also flows into the cells and creates a swirl that removes the particles from the cells.

13. The method of claim 12, wherein a robot is used to move the base along the face of the core sheet.

14. A system comprising:
   a vacuum attachment including a base having an upper face, a lower face and an outer surface disposed there between;
   a flow passage extending between the upper face and the lower face and along an axial flow path, the flow passage defined by an inner surface of the base;
   a metal cap covering a majority of the lower face and providing a smooth contact surface substantially parallel and spaced from the lower face;
   a cap opening defined in the metal cap such that the cap opening is fluidly coupled to and axially aligned with the axial flow path of the flow passage;
   a single orifice disposed on the lower face between the upper face and the contact surface, the single orifice extending through the base and a portion of the cap from the outer surface to the inner surface and opening into the flow passage, wherein the single orifice is perpendicular relative to the cap opening of the metal cap and the axial flow path of the flow passage; and
   a vacuum source for applying suction to the flow passage.

15. The system of claim 14, further comprising a robot having a robot arm and the vacuum attachment at an end of the robot arm.

16. The system of claim 15, wherein the robot is programmed to move the vacuum attachment along a tool path for cleaning a core sheet.

17. The system of claim 15, wherein the robot arm includes a mechanism for spring-loading the vacuum attachment to ensure constant engagement of the contact surface with a face of a core sheet.

18. The system of claim 15, further comprising a core sheet, wherein the robot arm places the contact surface of the base on a face of the core sheet.

19. The system of claim 14, wherein the contact surface has a surface roughness of no more than 63 Ra microinches.

20. The system of claim 14, wherein the flow passage in the base is a first flow passage; and wherein the vacuum attachment further includes a conduit extending from the base, the conduit defining a second flow passage that is in fluid communication between the first flow passage and the vacuum source, the conduit having at least one fin extending into the second flow passage, the fin configured to create a swirl.

* * * * *